(12) United States Patent
Papadias et al.

(10) Patent No.: US 6,907,252 B2
(45) Date of Patent: Jun. 14, 2005

(54) METHOD AND APPARATUS FOR DETECTING THE PRESENCE OF MOBILE TERMINALS

(75) Inventors: Constantinos B Papadias, Westfield, NJ (US); Manolis Tsangaris, Piraues (GR); Giovanni Vannucci, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 520 days.

(21) Appl. No.: 10/189,033

(22) Filed: Jul. 3, 2002

(65) Prior Publication Data

US 2003/0013460 A1 Jan. 16, 2003

Related U.S. Application Data

(60) Provisional application No. 60/304,513, filed on Jul. 11, 2001.

(51) Int. Cl.[7] .................................................. H04Q 7/20
(52) U.S. Cl. ..................................................... 455/456.1
(58) Field of Search ........................... 455/456.1, 456.3, 455/5, 6, 414.2, 67.1, 115; 342/450, 457

(56) References Cited

U.S. PATENT DOCUMENTS

| | | | | |
|---|---|---|---|---|
| 5,649,296 A | | 7/1997 | MacLellan et al. ......... 455/38.2 |
| 6,321,090 B1 | * | 11/2001 | Soliman ..................... 455/440 |
| 6,741,863 B1 | * | 5/2004 | Chiang et al. ........... 455/456.1 |
| 6,775,552 B2 | * | 8/2004 | Link, II ................... 455/456.1 |
| 6,799,049 B1 | * | 9/2004 | Zellner et al. .......... 455/456.1 |
| 6,799,052 B2 | * | 9/2004 | Allegrezza et al. ...... 455/456.4 |
| 2003/0083043 A1 | * | 5/2003 | Grego et al. ................ 455/410 |

* cited by examiner

Primary Examiner—Lee Nguyen
Assistant Examiner—Quyen Nguyen
(74) Attorney, Agent, or Firm—Kenneth M. Brown (57) ABSTRACT

A method and apparatus for detecting the presence of mobile terminals such as cell phones that are in the vicinity of one or more selected locations. The detected devices are identified and such information may then be provided to an application for its use. Specifically, a detector is installed at a selected location or locations for monitoring the transmissions of mobile terminals that come nearby. When such a transmission is detected, information from the base station with which the mobile terminal is communicating provides identification data, and based on timing relationships between the detected transmission and the data received from the base station, the detected mobile terminal may be specifically identified.

20 Claims, 5 Drawing Sheets

METHOD AND APPARATUS FOR DETECTING THE PRESENCE OF MOBILE TERMINALS

CROSS-REFERENCE TO RELATED APPLICATION

The present application hereby claims the benefit of previously filed Provisional Patent application Ser. No. 60/304,513, "Method For Detecting The Presence Of Mobile Terminals," filed by C. B. Papadias et al. on Jul. 11, 2001.

FIELD OF THE INVENTION

The present invention relates generally to the field of wireless communications devices such as cell phones and other mobile terminals and more particularly to a method and apparatus for detecting the presence of such mobile terminals that are in the proximity of one or more selected locations.

BACKGROUND OF THE INVENTION

It would be highly desirable to be able to detect the presence of a mobile terminal such as a cell phone in the vicinity of one or more selected locations, and moreover, to then identify the particular cell phone (e.g., to locate and identify a particular individual using his or her cell phone) which has been detected. In particular, it would be highly desirable to be able to do so with relatively low cost.

For example, such a capability would be highly useful for providing location-dependent advertising. In one embodiment of location-dependent advertising, a store in a shopping mall might install a detecting device near a particular store display. When a mobile phone user passed near the display, the detecting device could then advantageously detect the presence of a mobile phone nearby (for example, within a distance of five meters) and, preferably, could also identify the associated telephone number. The store computer could then send a message with an advertisement directly to the given mobile phone user.

Moreover, it is well known that a cell phone, such as, for example, a cell phone using the GSM (Global System for Mobile communications) standard, generates detectable radio interference. (The GSM wireless communications standard is fully familiar to those of ordinary skill in the art.) In fact, it is well known to users of GSM cell phones that if the cell phone is used in the vicinity of an electronic device (such as, for example, a radio receiver, stereo system, TV set, a wired/fixed telephone or even another GSM cell phone), the radio transmissions from the GSM cell phone may be inadvertently "picked up" by the electronic device and a signal proportional to the envelope of the radio transmission may be produced inside the electronic device. In fact, this typically unwanted signal may even disrupt the operation of the electronic device. (For example, it is particularly well known that GSM phones present a potential hazard for wearers of heart pacemakers, as the GSM signal may disrupt proper pacemaker operation if the phone is very near to the wearer's chest.)

SUMMARY OF THE INVENTION

We have recognized that the presence of a mobile terminal such as a cell phone in the vicinity of a given location may be advantageously determined by the detection of such heretofore unwanted radio interference. As a result, and in accordance with the principles of the present invention, a novel method and apparatus for detecting the presence of mobile terminals such as cell phones that are in the vicinity of one or more selected locations is provided herein.

In particular, and in accordance with one illustrative embodiment of the present invention, a detector receives a GSM signal transmitted by a GSM cell phone, and then analyzes the detected envelope by advantageously measuring the timing of envelope variations, in order to look for particular parameters specific to the particular activity to be detected (i.e., GSM cell phone registrations, or GSM cell phone call originations). Then, the mobile terminal so detected is advantageously identified based on information provided by a base station, and such a determination (i.e., the presence and the identity of the identified device in the vicinity of the given location) may then be provided to any arbitrary application for its use.

More specifically, in accordance with an illustrative embodiment of the present invention, one or more detectors are installed at one or more corresponding selected locations for monitoring the transmissions of mobile terminals that come nearby (i.e., in physical proximity thereto). When such a transmission is detected, information (which may be either explicit or implicit) from the base station with which the mobile terminal is communicating advantageously provides identification data, and based on timing relationships and/or other common characteristics between the detected transmission and the data received from the base station, the detected mobile terminal may be specifically identified.

DETAILED DESCRIPTION

Figure 1:
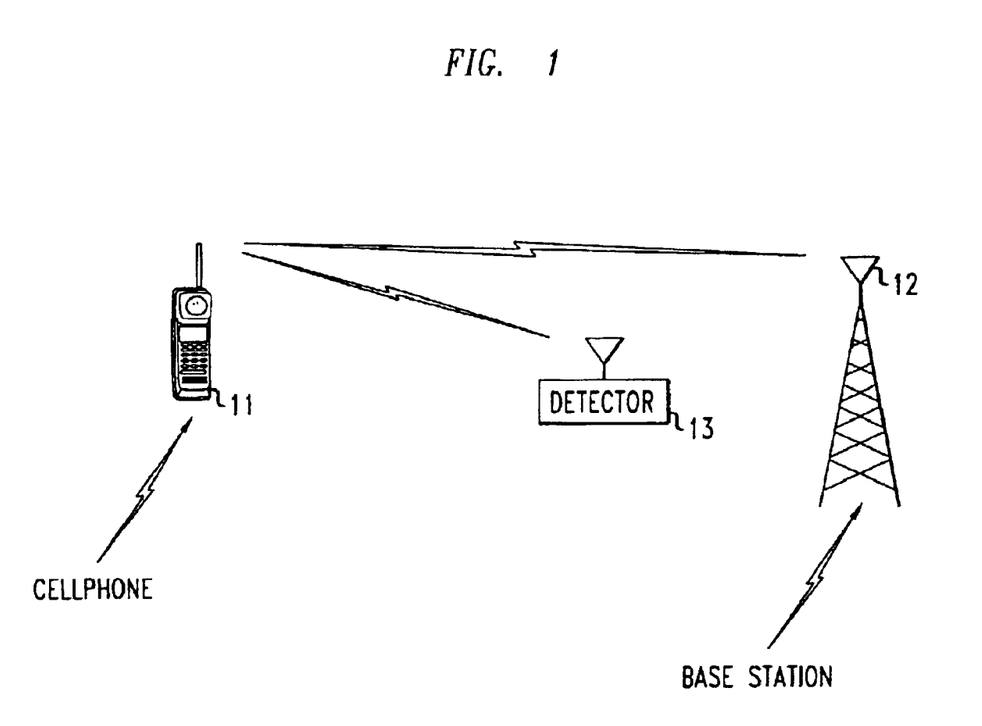
FIG. 1 shows a wireless communications environment having a cell phone, a base station, and a location detector in accordance with one illustrative embodiment of the present invention.

FIG. 1 shows a wireless communications environment having a cell phone, a base station, and a location detector in accordance with one illustrative embodiment of the present invention. In particular, the figure shows GSM cell phone 11, wireless base station 12 (shown as the receiving antenna tower thereof), and detector 13. When GSM cell phone 11 performs some activity that requires communication with base station 12, (for example, when the user of GSM cell phone 11 makes or receives a call, or when GSM cell phone 11 performs a network registration), it transmits radio signals to base station 12 (as well as receives such signals therefrom). In accordance with the principles of the present invention, however, detector 13 also receives such radio transmission signals from GSM cell phone 11, thereby enabling it to detect the presence of the cell phone in proximity thereto.

More specifically, and in accordance with one illustrative embodiment of the present invention, detector 13 advantageously "listens" to signals transmitted in proximity thereto (and in particular to the signal transmitted by GSM cell phone 11), and attempts to identify the presence of a GSM cell phone based on the signal it receives. In particular, detector 13 performs an analysis of the detected envelope of the signal received, by measuring the timing of envelope variations, in order to look for parameters and/or patterns specific to that particular activity (i.e., GSM cell phone transmission). Note that techniques for building low cost receivers for receiving an envelope-modulated radio signal are well known to those skilled in the art. For example, U.S. Pat. No. 5,649,296, entitled "Full Duplex Modulated Backscatter System" and issued to J. A. MacLellan et al. on Jul. 15, 1997 describes such a receiver. U.S. Pat. No. 5,649,296, which is commonly assigned to the assignee of the present invention, is hereby incorporated by reference as if fully set forth herein.

Figure 2:
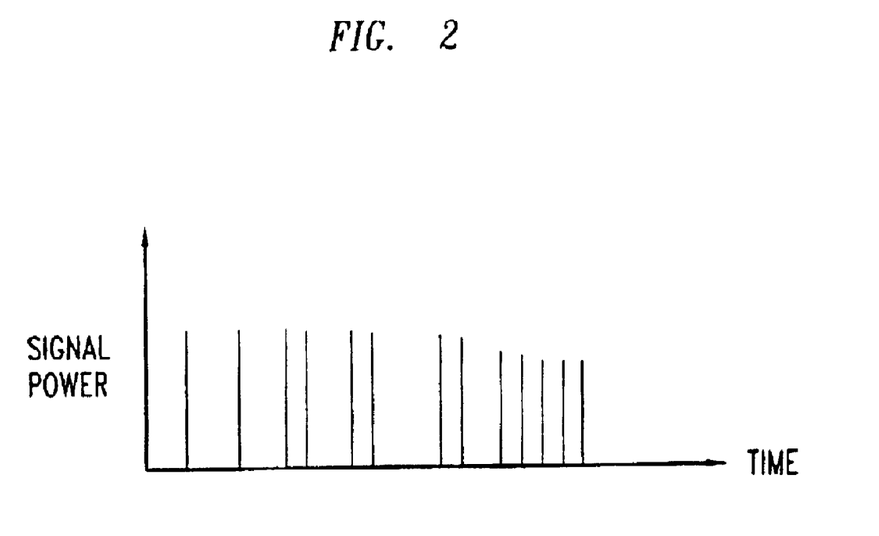
FIG. 2 shows an illustrative pattern of radio signal bursts such as might be emitted from a GSM standard cell phone.

More particularly, it is well known to those of ordinary skill in the art that GSM cell phones make use of the Time-Division Multiple-Access (TDMA) transmission technique. (The TDMA transmission technique is also fully familiar to those of ordinary skill in the art.) Therefore, in accordance with the TDMA technique, a GSM phone typically transmits radio signals in short bursts of radio power. FIG. 2 shows an illustrative pattern of radio signal bursts such as might be emitted from a GSM standard cell phone. Detector 13 can easily detect such a pattern of bursts, thereby recognizing that GSM cell phone 11 is in proximity thereto, and moreover, can then advantageously observe and record the specific pattern of bursts for identification purposes (see below).

Figure 3:
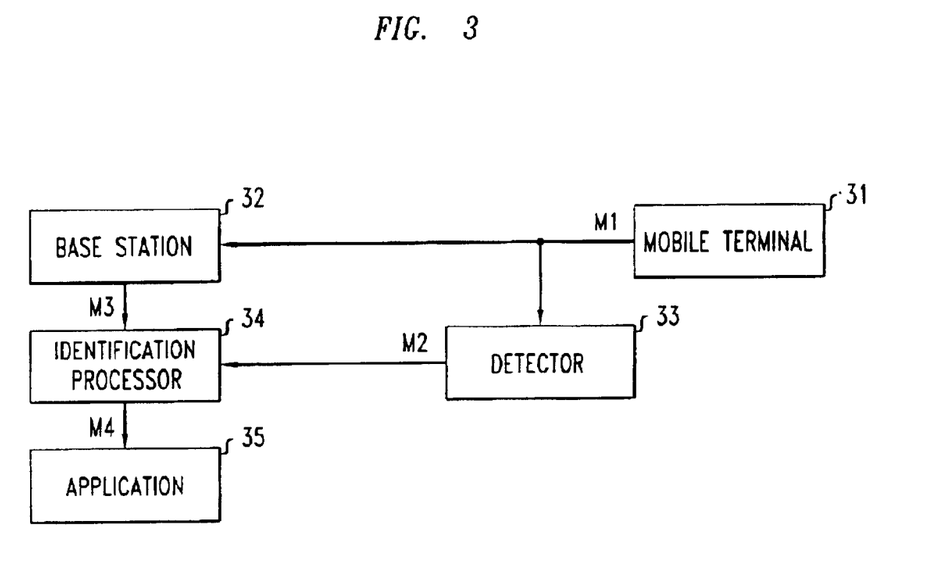
FIG. 3 shows a block diagram of a wireless communications system for detecting the presence of mobile terminals in accordance with one illustrative embodiment of the present invention.

FIG. 3 shows a block diagram of a wireless communications system for detecting the presence of mobile terminals in accordance with one illustrative embodiment of the present invention. The illustrative communications system comprises mobile terminal 31, base station 32, detector 33, identification processor 34, and application 35. As described above, mobile terminal 31 may be any device which allows a user to communicate across a wireless network through base station 32. In particular, mobile terminal 31 may, for example, comprise a conventional cell phone, such as a GSM cell phone (e.g., GSM cell phone 11 as shown in FIG. 1).

Base station 32 may, for example, comprise any conventional wireless communication network base station, which covers a particular geographic area and exchanges information with mobile terminals (such as mobile terminal 31) within that geographic area using radio waves. However, base station 32 may be advantageously modified in accordance with the principles of the present invention so as to enable it to also communicate particular information (e.g., mobile terminal identity information) to identification processor 34.

Detector 33 comprises a device which monitors the transmissions of mobile terminals (such as mobile terminal 31) in proximity thereto, and communicates its detection of such devices to identification processor 34. Detector 33 may, for example, operate in accordance with the discussion above with reference to detector 13 of FIG. 1, including, for example, in accordance with the receiver described in U.S. Pat. No. 5,649,296, cited above.

Identification processor 34 receives communications from both detector 33 and base station 32 in order to specifically be enabled to identify mobile terminals (such as mobile terminal 31) which are in proximity to detector 33 and have been detected thereby. And application 35 may be any application that wishes to make use of the information that a mobile terminal (such as mobile terminal 31) is in the vicinity of the location of detector 33 (i.e., is in proximity thereto).

In accordance with one illustrative embodiment of the present invention, the operation of the illustrative wireless communication system of FIG. 3 proceeds as follows. Assume that mobile terminal 31 is in the vicinity of detector 33, which continually monitors transmissions from mobile terminals (such as signal transmission M1 from mobile terminal 31 as shown in the figure). Each such received transmission is advantageously recorded and analyzed by detector 33. If detector 33 determines that the received signal is of interest (e.g., a GSM cell phone transmission), then it transmits a copy of the signal (or at least certain relevant parameters extracted therefrom), along with a time of receipt of the signal, to identification processor 34 for further processing. (Such a transmission from detector 33 to identification processor 34 is shown in the figure as signal transmission or "message" M2. Note that message M2 may be communicated in any conventional manner, including as either a wireless transmission or as a "land line" or wired transmission.)

Meanwhile, when base station 32 receives a conventional transmission from a mobile terminal (such as signal transmission M1 from mobile terminal 31 as shown in the figure), it advantageously transmits to identification processor 34 certain information about the transmission that it has received. (Such a transmission from base station 32 to identification processor 34 is shown in the figure as signal transmission or "message" M3. Note that message M3 may also be communicated in any conventional manner, including as either a wireless transmission or as a "land line" or wired transmission.) For example, base station 32 may transmit information regarding the time of the transmission that it received from mobile terminal 31 (i.e., the time that transmission M1 was received), information about the specific pattern of the transmission received from mobile terminal 31 (i.e., extracted parameters from the signal of transmission M1), and/or information regarding the identity of mobile terminal 31. Note that the identity of mobile terminal 31 will likely be known by base station 32 as a result of the exchange of conventional protocols therebetween.

Then, in accordance with an illustrative embodiment of the present invention, identification processor 34 advantageously compares the received information from the two sources (contained in messages M2 and M3, respectively) regarding the transmission M1, in order to determine, for example, that transmission M1, as received by each of base station 32 and detector 33, corresponds to the presence of mobile terminal 31 in proximity to detector 33. For example, in accordance with one illustrative embodiment of the present invention, when identification processor 34 determines that base station 32 received a call request at essentially the same time as detector 33 received a given, recognized transmission signal, it can advantageously identify the detected mobile terminal (e.g., mobile terminal 31) based on the identity information supplied to it by base station 32.

In accordance with another illustrative embodiment of the present invention, identification processor 34 may advantageously compare:

(a) extracted parameters of the signal transmitted by the detected mobile terminal (such as, for example, the timing pattern of radio signal bursts in the case of a GSM cell phone transmission), as communicated to identification processor 34 by detector 33; with (b) similar such information (e.g., extracted parameters) regarding the specific pattern of the transmission received from mobile terminal 31 by base station 32, as communicated to identification processor 34 by base station 32.

For example, parameters representative of the signal envelope and of certain timing characteristics thereof may be received by identification processor 34 from each of detector 33 and base station 32. If a comparison of these two sets of parameters indicates that the transmitted signals received by detector 33 and by base station 32 are likely to be the same signal (based on their characteristics), transmitted by the same mobile terminal (e.g., mobile terminal 31), then identification processor 34 can advantageously identify the detected mobile terminal (e.g., mobile terminal 31) based on the corresponding identity information supplied to it by base station 32. That is, in accordance with this illustrative embodiment of the present invention, when applied for example to GSM cell phone transmissions, the timing pattern of the burst trains produced by the cell phone, for example, may be regarded as a "fingerprint" which is unique to that particular phone call.

Note that in accordance with other illustrative embodiments of the present invention, other such fingerprints may be advantageously employed. For example, in the case of cell phones which make use of the Code-Division Multiple-Access (CDMA) transmission technique (which is fully familiar to those of ordinary skill in the art), spreading codes may serve as such fingerprints. (As is also familiar to those skilled in the art, spreading codes are sequences which are used in CDMA-based communications systems to identify different users and different base stations.)

Once identification processor 34 has determined that mobile terminal 31 is in fact in proximity to detector 33, it may, in accordance with an illustrative embodiment of the present invention, communicate this determination to application 35. (This communication from identification processor 34 to application 35 is shown in the figure as signal transmission or "message" M4. Note that message M4 may be communicated in any conventional manner, including as either a wireless transmission or as a "land line" or wired transmission.) In other words, identification processor 34 will be able to inform the application about the presence of a particular mobile terminal in the vicinity of a particular detector (e.g., mobile terminal 31 being in proximity to detector 33).

Figure 4:
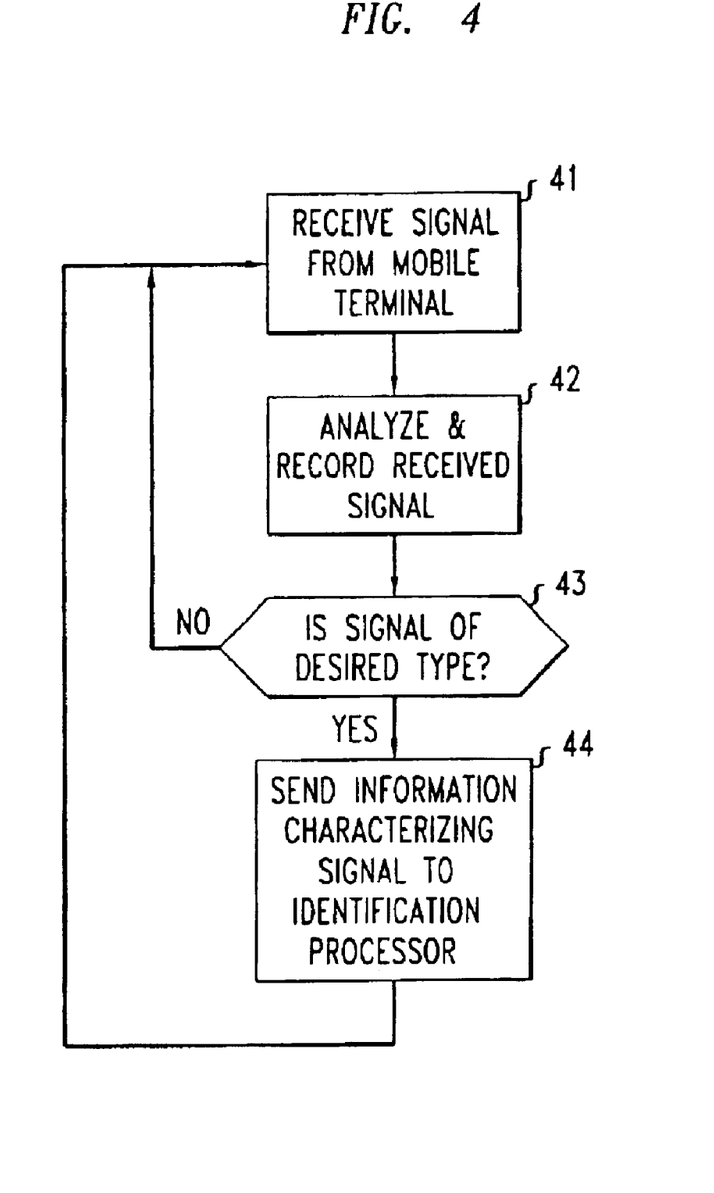
FIG. 4 shows a flow chart of the operation of a location detector for use in detecting mobile terminals in accordance with one illustrative embodiment of the present invention.

FIG. 4 shows a flow chart the operation of a location detector for use in detecting mobile terminals in accordance with one illustrative embodiment of the present invention. First, in block 41 of the figure, the location detector receives a signal transmitted by a mobile terminal in proximity thereto. In block 42, the detector analyzes and records the received signal. If the signal is determined to be of the appropriate type (e.g., a GSM cell phone transmission), as determined by decision box 43 in the figure, the received signal and/or relevant information characterizing it is sent to an identification processor, as shown in block 44.

Figure 5:
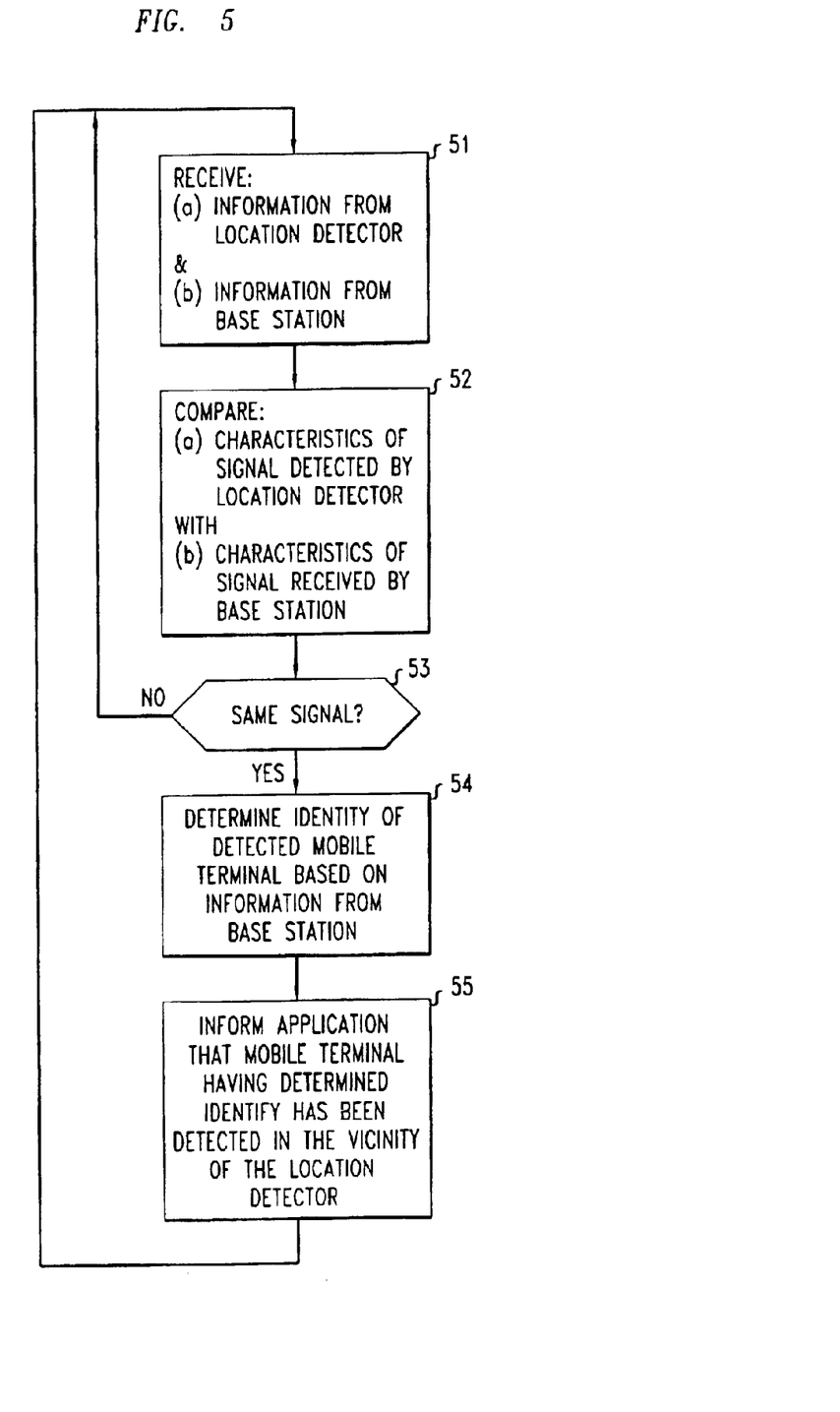
FIG. 5 shows a flow chart of the operation of an identification processor for use in detecting mobile terminals in accordance with one illustrative embodiment of the present invention.

FIG. 5 shows a flow chart of the operation of an identification processor for use in detecting mobile terminals in accordance with one illustrative embodiment of the present invention. First, in block 51 of the figure, the identification processor receives:

(a) information from a location detector regarding a transmission signal it has detected; and (b) information, including mobile terminal identity information, from a base station regarding a mobile terminal transmission that it has received.

Then, in block 52 of the figure, the identification processor compares:

(a) characteristics (e.g., timing information and/or parameters extracted from the received signal) of the transmission signal detected by the location detector; with (b) characteristics (e.g., timing information and/or parameters extracted from the received signal) of the mobile terminal transmission received by the base station.

If, as determined by decision box 53 of the figure, the comparison performed in block 52 indicates that the transmitted signals received by the location detector and by the base station are likely to correspond to the same signal (based on their characteristics), transmitted by the same mobile terminal, then the identification processor identifies the detected mobile terminal based on the corresponding identity information supplied to it by base station (in block 54 of the figure), and, finally, transmits this information (i.e., the fact that the identified mobile terminal has been detected in the vicinity of the given location detector) to an application (in block 55 of the figure).

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope.

For example, although the invention has been described primarily with particular reference to the GSM cell phone standard and the TDMA transmission technique used thereby, and although the primary illustrative embodiment described herein locates and identifies the presence of a GSM cell phone, the inventive technique is equally applicable to other wireless communications standards and transmission techniques as well. For example, cell phones which use the well-known CDMA transmission standard may also be located and identified in accordance with an illustrative embodiment of the present invention.

Moreover, appropriate modifications to the illustrative embodiments described herein for use with such other wireless communications standards will be obvious to those skilled in the art. In addition, it will be obvious to those of ordinary skill in the art how the above-described embodiments might be easily modified to include a plurality of detectors provided for detecting mobile terminals in the vicinities of any one of a plurality of locations. In such multiple detector embodiments, an application may advantageously make use of the information that a given (i.e., identified) mobile terminal is in the vicinity of a particular location. Similarly, it will be obvious to those skilled in the art that the technique of the present invention is equally applicable to environments in which multiple base stations communicate with a given cell phone—either sequentially or concurrently.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for detecting the presence of a mobile terminal in a vicinity of a given location, the mobile terminal for use in a wireless network, the method comprising the steps of:
   receiving, within said vicinity of said given location, a signal based on a transmitted signal from the mobile terminal;
   analyzing the received signal to determine one or more characteristics thereof;
   receiving information from a base station comprised in the wireless network, said information comprising one or more characteristics of the transmitted signal from the mobile terminal as determined by the base station, said information also comprising identity information corresponding to said mobile terminal;
   comparing the one or more characteristics of the received signal as determined by said analyzing step with the one or more characteristics of the transmitted signal from the mobile terminal as determined by said base station; and
   determining, based on a result of said comparing step, that the mobile terminal is in said vicinity of the given location and is identified by said identity information.

2. The method of claim 1 wherein the mobile terminal comprises a cell phone.

3. The method of claim 2 wherein the cell phone operates based on a GSM standard using a TDMA transmission technique.

4. The method of claim 2 wherein the cell phone uses a CDMA transmission technique.

5. The method of claim 1 wherein said step of analyzing the received signal is based on signal envelope variations thereof.

6. The method of claim 1 wherein said step of analyzing the received signal comprises identifying a spreading code.

7. The method of claim 1 wherein said characteristics of said received signal and said characteristics of said transmitted signal from the mobile terminal as determined by the base station each comprises a time of receipt of said received signal and said transmitted signal from the mobile terminal as determined by the base station, respectively.

8. The method of claim 1 wherein said characteristics of said received signal and said characteristics of said transmitted signal from the mobile terminal as determined by the base station each comprises a set of one or more parameters extracted from said received signal and said transmitted signal from the mobile terminal as determined by the base station, respectively.

9. The method of claim 1 wherein said identity information comprises at least a cell phone number.

10. The method of claim 1 further comprising the step of communicating that the mobile terminal is in said vicinity of the given location and is identified by said identity information to an application.

11. An apparatus for detecting the presence of a mobile terminal in a vicinity of a given location, the mobile terminal for use in a wireless network, the apparatus comprising:
   a first receiver, located within said vicinity of said given location, adapted to receive a signal based on a transmitted signal from the mobile terminal;
   a signal analyzer adapted to analyze the received signal to determine one or more characteristics thereof;
   a second receiver, adapted to receive information from a base station comprised in the wireless network, said information comprising one or more characteristics of the transmitted signal from the mobile terminal as determined by the base station, said information also comprising identity information corresponding to said mobile terminal; and
   a processor for
   (i) comparing the one or more characteristics of the received signal as determined by said signal analyzer with the one or more characteristics of the transmitted signal from the mobile terminal as determined by said base station, and for
   (ii) determining, based on a result of said comparison, that the mobile terminal is in said vicinity of the given location and is identified by said identity information.

12. The apparatus of claim 11 wherein the mobile terminal comprises a cell phone.

13. The apparatus of claim 12 wherein the cell phone operates based on a GSM standard using a TDMA transmission technique.

14. The apparatus of claim 12 wherein the cell phone uses a CDMA transmission technique.

15. The apparatus of claim 11 wherein said signal analyzer performs said analysis of the received signal based on signal envelope variations thereof.

16. The apparatus of claim 11 wherein said signal analyzer performs said analysis of the received signal by identifying a spreading code.

17. The apparatus of claim 11 wherein said characteristics of said received signal and said characteristics of said transmitted signal from the mobile terminal as determined by the base station each comprises a time of receipt of said received signal and said transmitted signal from the mobile terminal as determined by the base station, respectively.

18. The apparatus of claim 11 wherein said characteristics of said received signal and said characteristics of said transmitted signal from the mobile terminal as determined by the base station each comprises a set of one or more parameters extracted from said received signal and said transmitted signal from the mobile terminal as determined by the base station, respectively.

19. The apparatus of claim 11 wherein said identity information comprises at least a cell phone number.

20. The apparatus of claim 11 further comprising means for communicating that the mobile terminal is in said vicinity of the given location and is identified by said identity information to an application.

* * * * *